Jan. 2, 1962 R. F. PEDRICK 3,015,698
ANNOYANCE CALL TRAPPING CIRCUIT
Filed June 8, 1959
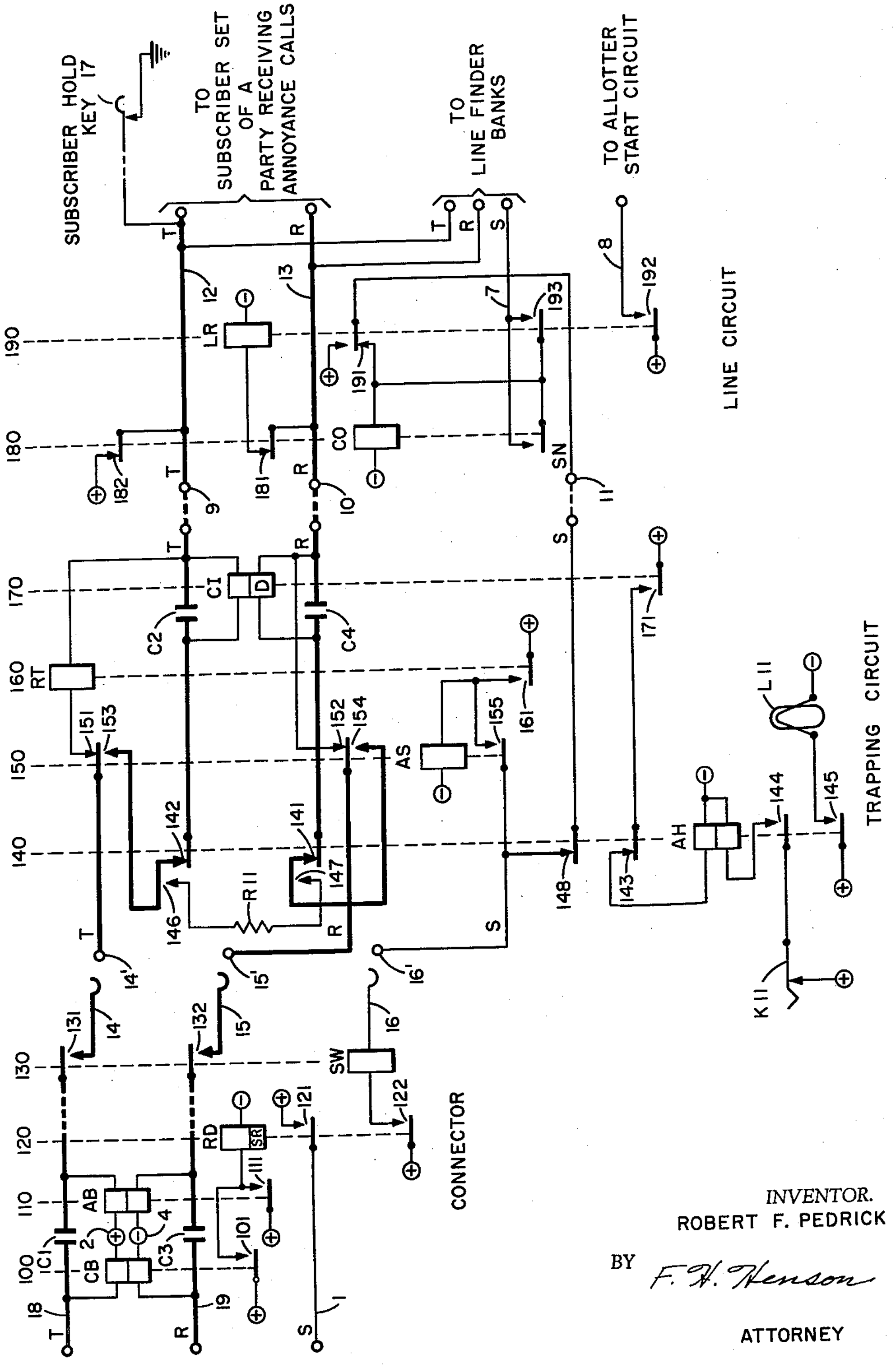
INVENTOR.
ROBERT F. PEDRICK
BY *F. H. Henson*
ATTORNEY United States Patent Office 3,015,698

Patented Jan. 2, 1962

3,015,698

ANNOYANCE CALL TRAPPING CIRCUIT

Robert F. Pedrick, Rochester, N.Y., assignor to General Dynamics Corporation, Rochester, N.Y., a corporation of Delaware Filed June 8, 1959, Ser. No. 818,582

6 Claims. (Cl. 179—18)

The present invention relates in general to automatic telephone systems and, more particularly, to annoyance call trapping circuits for use in automatic telephone systems.

Occasionally a telephone subscriber is repeatedly annoyed by an anonymous caller. It is desirable that the caller be identified so that it becomes possible to put an end to the calls. In addition, the location from which a call is made may be of interest to the police. The identification process is carried out by tracing through a switch train usually comprising a line finder, two or more selectors, and a connector, the train being set up by the calling party by dialing. In a large number of telephone systems the switch train is released when the calling party hangs up so that tracing thereafter becomes impossible. In certain telephone systems the switch train is released only after both the calling party and the called party hang up. In the latter type of system the call may be traced if the called party does not hang up, and contacts the telephone company in some manner excluding the use of his telephone so that tracing may be performed through the held switch train. It is desirable that the called party be able to notify the telephone company over the same telephone through which the annoyance call is received and thereafter be able to hang up and immediately place another call while the annoyance call is being traced.

Accordingly, it is a principal object of the present invention to provide a new and improved annoyance call trapping circuit.

It is a further object of the present invention to provide a circuit which may be readily inserted between the connector wire banks and the line circuit of a party receiving annoyance calls, for the purpose of trapping an annoyance call received by the party, so that the call may be traced.

It is a still further object of the present invention to provide an annoyance call trapping circuit which enables the called party to actuate a control at his subscriber set to cause the switch train to be trapped or held for tracing purposes, regardless of whether or not the calling party hangs up, which notifies someone at the exchange that he wishes the call traced, and which allows the called party to hang up immediately after actuating the control and place another call while the annoyance call is being traced.

The principal feature of the present invention is the provision of an annoyance hold relay which is energized by the called party receiving an annoyance call, which connects a shunt resistor across the answer bridge relay in the connector circuit to hold the switch train, which actuates a trace indicator at the exchange, and which releases the called party's line circuit, so that the called party may hang up and redial while the annoyance call is being traced.

Further objects, features and advantages of the present invention will become apparent as the following description proceeds and the features of novelty which characterize the present invention will be pointed out with particularity in the claims annexed to and forming a part of this specification.

For a better understanding of the present invention, reference may be had to the accompanying drawing of which the figure discloses the annoyance call trapping circuit of the present invention connected between the connector wire banks and the line circuit of a party receiving annoyance calls.

The left-hand portion of the figure discloses part of a conventional connector circuit of a step-by-step telephone switching system having access to a conventional line circuit through the annoyance call trapping circuit which is the subject of the present invention. Under normal circumstances the connector wire banks represented by terminals 14', 15' and 16' are directly connected to the line circuit input terminals 9, 10 and 11. In the event that the subscriber, whose subscriber set is coupled to the tip and ring output terminals 12 and 13 of the line circuit, is receiving annoyance calls, the annoyance circuit is inserted between the connector wire bank represented by terminals 14', 15' and 16' and line circuit input terminals 9, 10 and 11 as shown.

The connector circuit disclosed in the left-hand portion of the figure includes calling bridge relay 100 having a pair of windings connected to the tip and ring terminals 18 and 19 of the connector circuit as shown. These terminals communicate with a first subscriber set, not shown, through a preceding switch train, not shown, which comprises a line finder and one or more selector circuits, in the usual manner. After the afore-mentioned switch train is set up by directive signals transmitted by the subscriber at the first subscriber set, the calling bridge CB relay 100 becomes energized since an operating path for this relay is established through the closed hookswitch of the first subscriber set, in the conventional manner. The operation of CB relay 100 actuates normally open contacts 101 to cause the release delay relay RD120 to become energized, which in turn closes contacts 121 to thereby place ground potential upon back sleeve lead 1 to hold the switch train operated in the conventional manner.

When the digits of the called line circuit have been dialed, a circuit is completed to energize cut-off relay 180. This circuit extends from ground through closed contact 122, the winding of the SW relay 130, wiper 16, terminal 16', normally closed contact 148, terminal 11, closed contacts 191, and the winding of cut-off relay 180. A second subscriber set, not shown, coupled to the tip and ring output terminals 12 and 13 of the line circuit is rung in the conventional manner. When the called party answers his telephone, the hookswitch located within the second subscriber set is closed to energize the RT relay in the connector circuit, not shown, in the conventional manner. As a result, ringing is tripped and the AB relay 110 is connected across the closed D.C. loop in the conventional manner and becomes energized. This energizing circuit extends from ground terminal 2 through the upper winding of AB relay 110, closed contacts of the RT connector relay, not shown, closed contacts 131, wiper 14, terminal 14', closed contacts 151, the winding of the RT relay 160, the aforementioned hookswitch at the second subscriber set, not shown, closed contacts 152, terminal 15', wiper 15, operated contacts 132, the closed contacts of the RT connector relay, not shown, and the lower winding of the AB relay 110 to negative terminal 4. RT relay 160 whose winding is connected in series with this circuit is also energized. The operation of AB relay 110 causes contacts 111 to become actuated to thereby complete a second operating path for the RD relay which is already energized at this time. The operation of RT relay 160 closes contacts 161 which causes energization of the annoyance start relay 150. As a result, contacts 153, contacts 154 and contacts 155 become actuated. A locking circuit for AS relay 150 is completed through closed contacts 122, the winding of the SW relay 130, wiper 16, terminal 16', operated contacts 155 and the winding of the AS relay 150. The actuation of normally open contacts 153 and 154 completes an alternate voice path through the system. This path may be traced as follows: the tip input terminal 18 of the connector circuit, capacitor C1, actuated contacts 131, wiper 14, terminal 14', closed contacts 153, normally closed contacts 142, capacitor C2, the receiver of the subscriber set, connected across the tip and ring output terminals 12 and 13 of the line circuit, capacitor C4, closed contacts 141, operated contacts 154, wiper 15, terminal 15', closed contacts 132, capacitor C3 and the ring input terminal 19. Due to the opening of contacts 151 by the energization of AS relay 150, RT relay 160 is de-energized to open contacts 161. The AS relay 150, however, remains operated through the afore-mentioned locking circuit which includes closed contacts 155. The energization of the AS relay 150 also causes current to flow through the upper and lower windings of the cut-in relay 170. Because this relay is a differential relay and because current flow through the oppositely wound windings is equal, CI relay 170 remains unoperated.

After the parties hang up, CB relay 100 and AB relay 110 become de-energized to cause contacts 101 and 111 to open which in turn results in the de-energization of the RD relay 120. This action separates contacts 121 to thereby remove ground from the back sleeve lead 1 to cause the switch train to be released in the conventional manner. It should be noted that this action will occur only if both the CB relay 100 and the AB relay 110 become de-energized.

If the called party desires to have the call traced, he does not hang up immediately. The CB relay 100 becomes de-energized when the calling party hangs up to open contacts 101. Since the called party has not yet hung up, AB relay 110 remains energized so that the RD relay 120 remains energized to maintain the switch train. At this time the called party actuates a key 17 or any other well-known device located at the subscriber set for placing ground on either the tip or ring lead to unbalance the line. This action operates differential CI relay 170. AB relay 110 remains operated since the flux produced by current flowing through one winding alone is sufficient to keep contacts 111 closed. As a result of the operation of CI relay 170, contacts 171 are actuated to cause an operating circuit to be completed through the upper winding of AH relay 140, through the normally closed contacts 143, and through operated contacts 171 to energize the annoyance hold relay 140. Normally open contacts 144 are closed, thereby providing a locking circuit for AH relay 140 through its lower winding and through contacts 144 and normally closed contacts 6 of key K11. At this time contacts 143 are opened but this action has no effect on AH relay 140 due to the effect of the afore-mentioned locking circuit. Contacts 145 are closed to actuate a trace indicator which may be a lamp L11 which notifies personnel at the exchange that the call is to be traced through the held switch train. The operation of AH relay 140 also closes contacts 146 and 147 and also opens contacts 141 and 142, after the closing of contacts 146 and 147. This action connects resistor R11 across the tip and ring leads to thereby hold the AB relay 110 operated, to maintain the switch train, regardless of the state of the called party's hookswitch. The called party may now hang up.

It is very important to note that the energization of AH relay 140 also opens contacts 148 to de-energize cut-off relay 180. As a result, contacts 181 and 182 are closed to thereby cause the line relay 190 to become enabled so that a subsequent off-hook condition of the subscriber set will cause the line relay to become energized through contacts 181, the hookswitch and contacts 182. Should the called party desire to place another call, he removes his handset from its cradle to close the hookswitch, thereby energizing line relay 190. Contacts 192 are closed and ground is placed upon the allotter start lead 8 to cause the allotter to operate and control an assigned line finder to hunt for the called party's T, R and S leads which are wired to the line finder banks in the conventional manner. Contacts 193 are also closed to apply negative potential through cut-off relay 180 to sleeve 7 to cause seizure of the line circuit by the line finder in the conventional manner.

Thus, the called party may place another call while the switch train set up by the previous calling party is held and traced by personnel at the exchange who have been alerted by the lighting of the tracing indicator lamp L11 as previously described. After the call is traced, key K11 is opened to de-energize AH relay 140 which releases the switch train by removing resistor R11 from across the tip and ring leads, and which extinguishes L11. The annoyance circuit is then released and input terminals 9, 10 and 11 of the line circuit are reconnected to the connector wire bank represented by terminals 14', 15' and 16'.

While I have shown and described a specific embodiment of the invention, other modifications will readily occur to those skilled in the art. I do not therefore desire the invention to be limited to the specific arrangement shown and described, and it is intended in the appended claims to cover all modifications within the spirit and scope of my invention.

What is claimed is:

1. An annoyance call trapping circuit for preventing the release of switching means for connecting a first line associated with a first subscriber set of a calling party to a second line associated with a second subscriber set of a called party through a connector circuit and a line circuit, said trapping circuit comprising, means for releasing the switching means upon the receipt of a signal over the second line indicative of an inactive condition of the second subscriber set, means for initiating the holding of the switching means regardless of the state of activation of the second subscriber set, means responsive to the operation of said initiating means for preventing an inactive condition of the second subscriber set from actuating said means for releasing thereby to facilitate the tracing of the annoyance call, and means responsive to the operation of said initiating means for altering the state of the line circuit so that a call may be placed at the second subscriber set while the annoyance call is being traced.

2. The combination as set forth in claim 1 wherein said means for initiating the holding of the switching means includes a differential relay and also includes means under the control of the called party for operating said differential relay by causing unbalance of the current flow through the windings of said differential relay.

3. In a telephone system, a line circuit associated with a party receiving annoyance calls, a line associated with a party making annoyance calls, a connector circuit including a back sleeve lead and an answer bridge relay, switching means for connecting said line to said connector circuit, a subscriber set of the party receiving annoyance calls which includes a switch coupled to said answer bridge relay through said line circuit so that the state of said switch controls the state of said answer bridge relay, means for releasing said switching means in response to a change of potential on said back sleeve lead caused by deenergization of said answer bridge relay, means for initiating the holding of said switching means regardless of the state of said switch, means for connecting a shunt circuit across said switch in response to the operation of said initiating means thereby maintaining said answer bridge relay in a state of energization regardless of the opening of said switch, to prevent the release of said switching means, and means for altering the state of said line circuit in response to the operation of said initiating means so that the called party may place another call while the annoyance call is being traced.

4. The combination as set forth in claim 3 wherein said means for initiating the holding of said switching means includes a differential relay and also includes means under the control of the called party for operating said differential relay by causing unbalance of the current flow through the windings of said differential relay.

5. An annoyance call trapping circuit comprising, a line circuit including a line relay, a subscriber set of a party receiving annoyance calls which includes a switch, a connector circuit including a back sleeve lead, a front sleeve lead and an answer bridge relay, said answer bridge relay coupled to said switch through said line circuit, the state of said switch controlling the state of said answer bridge relay, a line associated with a party making annoyance calls, switching means for connecting said line to said connector circuit, means for altering the potential on said back sleeve lead upon the operation of said answer bridge relay to thereby maintain the switching means coupled to said connector circuit as long as said answer bridge relay remains operative, means for initiating the holding of said switching means, means responsive to the operation of said means for initiating the holding of said switching means for connecting a shunt circuit across said switch, thereby to maintain said answer bridge relay in a state of energization regardless of the state of said switch so that said switching means may be maintained and the annoyance call traced, and means responsive to the operation of said means for initiating the holding of said switching means for altering the potential on said front sleeve lead to thereby enable said line relay so that the called party may place another call while the annoyance call is being traced.

6. An annoyance call trapping circuit for preventing the release of switching means for connecting a first line associated with a first subscriber set of a calling party to a second line associated with a second subscriber set of a called party through a connector circuit and a line circuit, said trapping circuit comprising, means for releasing the switching means upon the receipt of two signals, one from the first line indicative of an inactive condition of the first subscriber set, and the other from the second line indicative of an inactive condition of the second subscriber set, means for initiating the holding of the switching means regardless of the states of activation of the first and second subscriber sets, means responsive to the operation of said means for initiating the holding of the switching means for preventing an inactive condition of the first and second subscriber sets from affecting said means for releasing thereby to facilitate the tracing of the annoyance call, and means responsive to the operation of said initiating means for altering the state of the line circuit so that a call may be initiated at the second subscriber set while the annoyance call is being traced.

References Cited in the file of this patent

UNITED STATES PATENTS

| | | |
|---|---|---|
| 1,298,293 | Clausen | Mar. 20, 1919 |
| 2,070,874 | Voss et al. | Feb. 16, 1937 |
| 2,077,537 | Taylor | Apr. 20, 1937 |
| 2,879,338 | Joel et al. | Mar. 24, 1959 |